Figure 1:
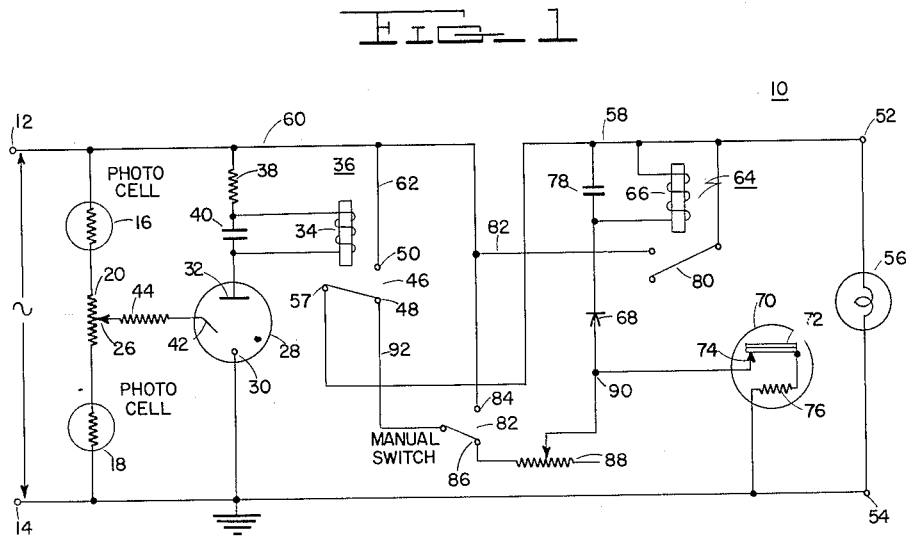

May 7, 1963  L. E. WORDEN  3,089,065
LIGHT CONTROLLED ELECTRICAL SYSTEM AND RELAY THEREFOR
Filed Dec. 7, 1960  2 Sheets-Sheet 1

INVENTOR.
LESLIE E. WORDEN
BY Gust & Irish
ATTORNEYS

May 7, 1963  L. E. WORDEN  3,089,065
LIGHT CONTROLLED ELECTRICAL SYSTEM AND RELAY THEREFOR
Filed Dec. 7, 1960  2 Sheets-Sheet 2
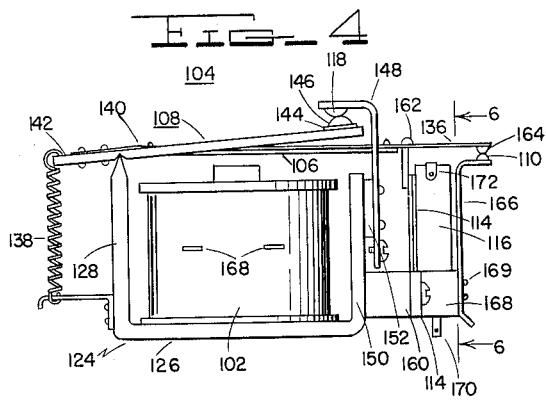
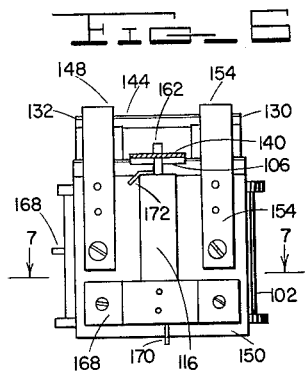
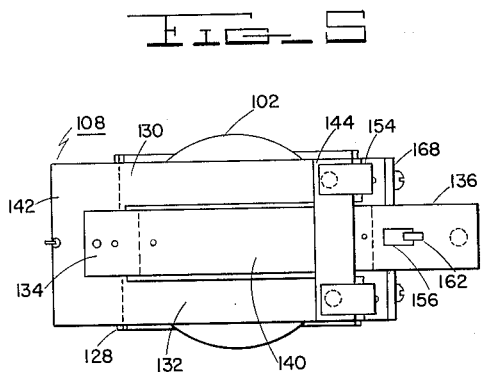
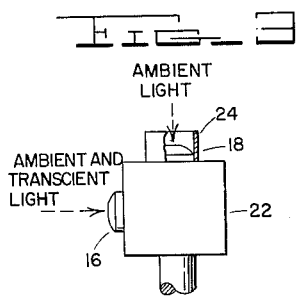
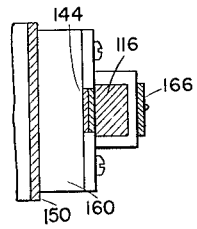
*INVENTOR.*
LESLIE E. WORDEN
BY Gush & Irish
ATTORNEYS ର
United States Patent Office 3,089,065
Patented May 7, 1963

3,089,065
LIGHT CONTROLLED ELECTRICAL SYSTEM AND RELAY THEREFOR
Leslie E. Worden, % Tri-State College, Angola, Ind.
Filed Dec. 7, 1960, Ser. No. 74,359
10 Claims. (Cl. 317—130)

This invention relates generally to light-controlled electrical systems, and more particularly to an electrical system which is both light and manually controlled, and to a relay therefor.

A common application of light-controlled electrical systems is for turning on exterior lights of a residence, such as driveway flood lights, responsive to automobile headlights. In such a system, it is desirable that the exterior lights be illuminated responsive to the automobile headlights, that the exterior lights thereafter remain on for a predetermined period, such as two minutes, to permit the driver and occupants of the automobile to walk into the residence, and that following the predetermined period, the exterior lights be automatically extinguished. It is further desirable that the exterior lights be capable of being manually turned on and left on as long as desired. It is necessary that such a system incorporate provisions for ambient light compensation so that the exterior lights are not turned on responsive to ordinary daylight, and it is of course highly desirable that the system be characterized by its simplicity and relatively low cost.

While systems have been proposed for turning on exterior lights responsive to automobile headlights in which the lights remained on for a predetermined period and were thereafter automatically turned off, to the best of the present applicant's knowledge, such systems were characterized by their complexity and thus relatively high cost. To the best of the present applicant's knowledge, no such prior systems permit manual control of the lights, in essence automatically overriding the automatic control.

It is accordingly an object of my invention to provide an improved light controlled electrical system.

Another object of my invention is the provision of a light and manually controlled electrical system.

Yet another object of my invention is to provide an improved light and manually controlled electrical system incorporating a dual armature latching relay.

A further object of my invention is to provide a dual armature latching relay.

Further objects and advantages of my invention will become apparent by reference to the following description and the accompanying drawing, and the features of novelty which characterize my invention will be pointed out with particularity in the claims annexed to and forming a part of this specification.

My invention in its broader aspects provides a light and manually controlled electrical system comprising light-sensitive means, a relay having an operating coil, and means coupling the light-sensitive means and the coil for energizing the same responsive to a change in the light level sensed by the light-sensitive means. An output circuit is provided for connection to a load and a relay is provided with contacts for coupling the output circuit to a source of energizing potential responsive to energization of the operating coil. Means are provided for maintaining the coupling of the output circuit to the source for a predetermined time following deenergization of the coil and manually actuated switch means is provided for selectively energizing the output circuit from the source and overriding the light-sensitive means. In the preferred embodiment of my invention, the relay is provided with first and second armatures acted upon by the coil, the first armature actuating contacts to close the same thereby coupling the load circuit to the source responsive to energization of the coil. In the preferred embodiment, the coupling maintaining means comprises means for latching the first armature in its contacts closed position, and electrically energizable means for releasing the latching means after a predetermined time delay, the second armature actuating other contacts coupling the electrically energizable means across the load circuit responsive to deenergization of the coil.

Figure 2:
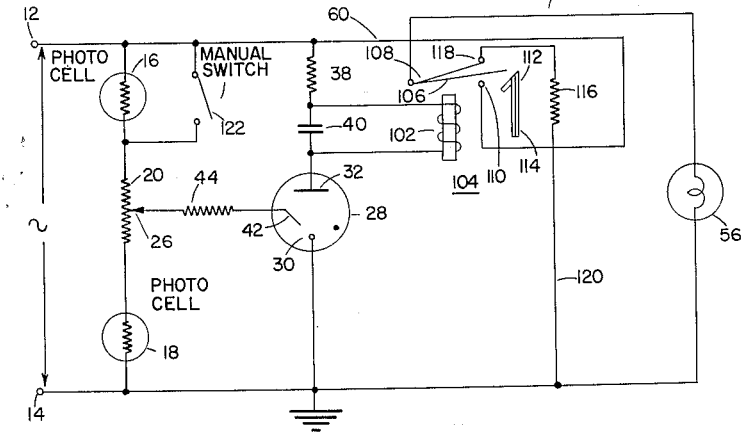

In the drawing:
FIG. 1 is a schematic illustration of one embodiment of my invention;
FIG. 2 is a schematic illustration of the preferred embodiment of my invention;
FIG. 3 is a fragmentary illustration further showing the ambient light-compensation arrangement of FIGS. 1 and 2;
FIG. 4 is a side-elevational view of my improved dual armature latching relay employed in the system of FIG. 2;
FIG. 5 is a top view of the relay of FIG. 4;
FIG. 6 is an end view of the relay of FIG. 4, taken along the line 6—6 thereof; and
FIG. 7 is a fragmentary cross-sectional view taken along the line 7—7 of FIG. 6.

Referring now to FIG. 1, there is schematically shown at 10 a system in accordance with my invention comprising a pair of input terminals 12 and 14 adapted to be connected to a suitable source of energizing potential, such as 115 volts, 60 cycles, single-phase alternating current. A pair of photoconductive cells 16 and 18 are provided serially connected with potentiometer 20 across input terminals 12 and 14; photocells 16 and 18 are of the type which have high dark resistance and relatively low resistance responsive to light impinging thereon. Referring momentarily to FIG. 3, photocells 16 and 18 are preferably mounted in a housing 22 with photocell 18 having a shield 24 therearound and being disposed vertically so as to receive ambient light only, whereas photocell 16 is disposed to receive both ambient and transient light, such as the light from automobile headlights. It will be readily comprehended that photocells 16 and 18 and potentiometer 20 form a voltage divider across input terminals 12 and 14 and that so long as the light impinging upon photocells 16 and 18, whether it be dark, as at night, or daylight, is equal, the potential of adjustable tap 26 of potentiometer 20 will not change. However, it will further be seen that under ambient dark conditions, as at night, with the resistance of photocells 16 and 18 thus normally high, when transient light, as from automobile headlights, impinges upon photocell 16, its resistance will drop to a substantially lower level, thus immediately increasing the potential of tap 26.

A gas discharge tube 28 is provided having its cathode 30 directly connected to input terminal 14, which may be considered to be the grounded side, as shown, and having its anode or plate 32 serially connected to input terminal 12 by operating coil 34 of relay 36 and resistor 38, with capacitor 40 being connected in shunt across operating coil 34. The control electrode 42 of tube 28 is connected to movable tap 26 of potentiometer 20 by resistor 44; the tap 26 is adjusted so that the voltage impressed on the control electrode 42 of tube 28 is not sufficient to fire the tube when the light impinging upon photocells 16 and 18 is equal, but will cause the tube to fire when transient light impinges upon photocell 16 with photocell 18 being exposed to a dark ambient light condition. It will be seen that firing of tube 28 will energize operating coil 34 of relay 36 thus causing its contacts 46 to pick-up from position 48 to position 50.

Photocells 16 and 18 are preferably cadmium sulphide or cadmium selenide photoconductive cells, such as Clairex CL-2 or CL-3. Resistor 44 serves to limit the current flow in the cathode-control electrode circuit of the tube 28, resistor 38 serves to limit surge of current in the cathode-plate circuit of the tube and capacitor 40 is a filter capacitor employed to prevent chattering of relay 36.

A pair of load circuit output terminals 52 and 54 are provided adapted to be connected to a load to be controlled, shown schematically as being an incandescent lamp 56, output terminal 54 being directly connected to input terminal 14 as shown. Output terminal 52 is directly connected to movable contact 57 of contacts 46 of relay 36 by connection 58, stationary contacts 50 being directly connected to input terminal 12 by connections 60 and 62, as shown. It will now be readily seen that when operating coil 34 of relay 36 is energized, contacts 46 are picked-up, thus causing movable contact 57 to engage stationary contact 50, thus energizing lamp 56 through a circuit starting with input terminal 12, connections 60 and 62, contacts 50, 57, connection 58 and back to input terminal 14.

It will readily be comprehended that the transient light impinging upon photocell 16 resulting in energization of operating coil 34 of relay 36 may only momentarily impinge upon photocell 16 and thus that tube 28 will be turned off and coil 34 deenergized, thereby to drop out contacts 46 of relay 36 immediately following energization of coil 34, whereas, as indicated, it is desired that lamp 56 be illuminated for a predetermined period of time, such as, for example, five minutes. In order to provide for maintenance of the coupling of lamp 56 to input terminals 12 and 14, following deenergization of coil 34 of relay 36, I provide another relay 64 having its operating coil 66 serially connected with diode 68 and thermal time delay switch 70 across the output circuit. Thermal time delay switch 70 comprises a bimetallic element 72 carrying contacts 74 and a heater 76 all connected in series, as shown, contact 74 being normally closed by bimetallic element 72. A capacitor 78 is connected in shunt across operating coil 66 of relay 64. Relay 64 is provided with contacts 80 which when picked up responsive to energization of coil 66 directly connect the output terminal 52 to the input terminal 12 by means of a connection 82. It will now be seen that as soon as coil 34 of relay 36 is energized, thus picking up the contacts 46 and energizing the output circuit, operating coil 66 of relay 64 will be energized, thus picking up its contacts 80 thereby directly connecting lamp 56 to input terminals 12 and 14 through connections 60, 82 and 58, the picking up of contacts 80 serving to seal-in coil 66 of relay 64 so that it remains energized through diode 68 and thermal time delay switch 70 even though coil 34 of relay 36 is deenergized and contacts 46 have dropped out thereby breaking the circuit from connection 62 to connection 58.

Capacitor 78 is a filter capacitor employed to prevent chattering of relay 64 and diode 68 is employed as a half-wave rectifier for providing rectified direct current for energizing operating coil 66 of relay 64.

A manual switch 82 is provided having an "On" position 84 and an "Off" position 86. Switch 82 in its "Off" position serially connects adjustable resistor 88 between point 90 intermediate diode 68 and the thermal time delay switch 70 and stationary contacts 48 of contacts 46 of relay 36. The characteristics of heater 76 and bimetallic element 72 of thermal time delay switch 70 are such that bimetallic element 72 does not open contacts 74 responsive to the flow of normal energizing current through operating coil 66 of relay 64. It will be observed, however, that with manual switch 82 in its "Off" position 86 and with coil 34 of relay 36 being deenergized thus connecting movable contact 57 to stationary contact 48, adjustable resistor 88 is connected in shunt across diode 68 and operating coil 66 of relay 64. The combined current flow through adjustable resistor 88 and operating coil 66 is sufficient to cause heater 76 to deflect bimetallic element 72 in turn to open contact 74 after a predetermined time delay; it will be seen that adjustment of resistor 88 will determine the current flow in the shunt circuit and in turn the time delay provided by thermal time delay switch 70. When heater 76 has caused sufficient deflection of bimetallic element 72 to open contacts 74, it will be seen that operating coil 66 of relay 64 will be deenergized thus dropping out contacts 80 and disconnecting lamp 56 from the source 12, 14.

With operating coil 34 of relay 36 deenergized, and thus with contacts 46 dropped out thereby connecting movable contact 57 to stationary contact 48, it will be seen that when manual switch 82 is now moved to position 84, lamp 56 is again directly connected across the input terminals 12, 14 through connection 60, manual switch 82 in its "On" position 84, connection 92, contacts 48, 57 and connection 58; this circuit will be maintained so long as switch 82 is in its "On" position 84. It will be observed that in this position of manual switch 82, and with contacts 46 of relay 36 in the dropped-out position, coil 66 of relay 64 will be energized and sealed in through contacts 80. However, with switch 82 in its "On" position 84, adjustable resistor 88 is not connected in shunt across operating coil 66 and, as previously indicated, the current flow through operating coil 66 alone is insufficient to actuate thermal time delay switch 70. However, when switch 82 is returned to its "Off" position, resistor 88 is again connected in shunt with operating coil 66 thereby initiating the time delay operation of thermal time delay switch 70. It will be seen that with manual switch 82 in its "On" position 84, energization of coil 34 of relay 36 and picking up of contacts 46 is of no effect since operating coil 66 of relay 64 is already energized.

In an actual circuit in accordance with FIG. 1, the following components were employed:

| | |
|---|---|
| Photocells 16 and 18 | Clairex CL-2. |
| Potentiometer 20 | 200,000 ohms. |
| Resistor 44 | 100,000 ohms. |
| Resistor 38 | 1,000 ohms. |
| Capacitor 40 | 10 microfarads. |
| Operating coil 34 | 10,000 ohms. |
| Tube 28 | 5823. |
| Resistor 88 | 800 ohms adjustable. |
| Capacitor 78 | 10 microfarads. |
| Operating coil 66 | 10,000 ohms. |
| Diode 68 | 30 milliamps. |
| Thermal switch | Ordinary Christmas tree lamp flasher providing 20 through 50 seconds' time delay. |

NOTE.—Resistor 88 increases time delay period to approximately 2 minutes.

Referring now to FIG. 2 in which like elements are indicated by like reference numerals, the preferred embodiment of my invention is generally shown at 100. Here, I again provide photoconductive cells 16 and 18 serially connected with potentiometer 20 across input terminals 12 and 14 with tap 26 of potentiometer 20 being connected to control electrode 42 of gas tube 28 by resistor 44 and with cathode 30 again being connected to ground as shown. Here, anode or plate 32 of tube 28 is serially connected with operating coil 102 of my improved dual armature latching relay 104 and resistor 38 to input terminal 12 with capacitor 40 being connected in parallel with operating coil 102.

My improved dual armature latching relay 104 comprises first and second armatures 106 and 108 acted upon by coil 102. When coil 102 is energized armature 106 engages stationary contact 110 thereby connecting lamp 56 for energization from input terminals 12 and 14 through connection 60, armature 106 contact 110 and connection 58. Armature 106 is latched in its picked-up position closing contact 110 by means of a latching member 112 including a bimetallic element 114. Thus, as soon as coil 102 of relay 104 is energized, armature 106 closes contact 110 and is latched by latching member 112 thereby to maintain the coupling of lamp 56 to input terminals 12 and 14 despite the fact that coil 102 is thereafter deenergized. As will be hereinafter more fully described, when coil 102 is energized, armature 108 opens contact 118.

Bimetallic element 114 is thermally affected by a suitable heater 116 serially connected between stationary contact 118 and ground as shown. It will now be seen that when coil 102 is deenergized, armature 106 will still be latched to close contact 110 by means of latching member 112, however, armature 108 will return to its dropped out position, thereby closing contact 118 to energize heater 116 from input terminals 12, 14 through connection 60, armature 106 closing contact 110, armature 108 closing contact 118, and connection 120. After a predetermined time delay, bimetallic element 114 will be sufficiently deflected under the influence of heater 116 so as to unlatch armature 106 thereby opening contacts 110 and breaking the energizing connection to both lamp 56 and heater 116. In this embodiment, manual switch 122 is connected in shunt across photocell 16. It will thus be seen that closing of manual switch 122 has the same effect upon tube 28 as impingement of transient light upon photocell 16 with photocell 18 being exposed to a dark condition and thus tube 28 will fire thereby energizing coil 102. However, so long as switch 122 is closed, tube 28 will continue to conduct thereby maintaining coil 102 energized and in turn maintaining armatures 106 and 108 in their picked up conditions. As soon as switch 122 is opened, however, coil 102 will be deenergized, thus returning armature 108 to its dropped out condition closing contact 118 to energize heater 116 to initiate the time delay period after which armature 106 is unlatched and contact 110 opened to extinguish lamp 56 and deenergize heater 116.

The circuit constants of the system of FIG. 2 are preferably the same as those enumerated above in connection with the system of FIG. 1, operating coil 102 of dual armature latching relay 104 having a resistance of 5,000 to 10,000 ohms.

Referring now to FIGS. 4, 5 and 6, my improved dual armature latching relay 104 comprises a generally U-shaped magnetic frame 124 having its bar portion 126 supporting one end of coil 102. Frame 124 has a pivot portion 128 extending upwardly along one side of coil 102 with armature 108 being pivoted thereon. Armature 108 is generally U-shaped and is pivoted on pivot member 128 at a point remote from the ends of its legs 130 and 132 with its legs extending over the other end of coil 102, as shown. Armature 106 is elongated and secured to flat spring 140 which has its end 134 secured to end 142 of armature 108. Armature 106 and spring 140 extend between legs 130 and 132 of armature 108 with the other end 136 of spring 140 extending outwardly beyond the ends of legs 130 and 132 of armature 108. Spring 138 interconnects end 142 of armature 108 and pivot portion 128 of frame 124 and normally biases armatures 108 and 106 to their dropped-out position.

Legs 130 and 132 of armature 108 are interconnected by a bar portion 144 adjacent their ends, bar 144 being on the side of armature 108 remote from armature 106, thus permitting spring 138 to restore armature 108 to its dropped out position when coil 102 is deenergized despite the fact an armature 106 is latched, as will be hereinafter described. Movable contact 146 is carried by bar 144 cooperating with stationary contact 118, stationary contact 118 in turn is supported by a bracket 148 secured to portion 150 of frame 124 by an insulating spacer 152. Inspection of FIGS. 5 and 6 will reveal that two sets of contacts may be provided on bar 144 with brackets 148 supporting stationary contact 118 being disposed on one side of armature 106 and with a similar bracket 154 supporting another stationary contact cooperating with another movable contact being supported on the other side of armature 106.

An opening 156 is formed in spring 140 adjacent end 136 and movable contact 164 is carried on end 136, as shown. Bimetallic element 114 has one end supported on portion 150 of frame 124 by means of insulating spacer 160 and extends upwardly generally parallel to frame portion 150 which in turn extends upwardly on the side of coil 102 remote from pivot portion 128. A latching member 162 is provided attached to the other end of bimetallic element 114, as by spot welding, and normally extending through opening 156 to engage an edge thereof when armature 106 is in its picked-up position, as shown in FIGS. 4, 5 and 6. It will be understood that latching member 162 may be an integral part of bimetal 114. It will be seen that deflection of bimetallic element 114 to the left as viewed in FIG. 4 will result in latching member 162 disengaging the edge of opening 156 so that armature 106 will be returned to its dropped out position under the influence of spring 140.

Heater 116 is an elongated box-like member extending upwardly in normal engagement with the side of bimetal 114 remote from frame portion 150, heater 116 and bimetal 114 being clamped to spacer 160 by an insulating clamp 168. Leaf spring 140 on armature 106 carries movable contact 164 cooperating with stationary contact 110 carried by a member 166 which is attached to the lower end of the clamp 168, as with by rivets 169, as shown. Coil 102 is provided with suitable terminals 168, as shown. As indicated in connection with the system of FIG. 2 above, stationary contact 118 is preferably connected in series with heater 116 so that when armature 108 returns to its dropped out position responsive to deenergization of coil 102 and under the influence of spring 138 thereby closing movable contact 146 and stationary contact 118, heater 116 is energized thereby to deflect bimetallic element 114 and cause latching member 162 to release armature 106 after a predetermined time delay. Heater 116 is preferably of the type manufactured by International Resistance Corporation under the designation PW–5. This is a five watt wire-wound resistor encased in a ceramic shell. Since the case or shell of heater 116 is preferably formed of insulating material, bimetallic element 116 abuts or lays against one side thereof so that no heat transfer need be made through air. Thus, the thermal lag required to give a resonable time delay will be provided mainly from heating of the ceramic shell and not from heating of an air mass between the heater and the bimetal. Heater 116 is provided with terminals 170 and 172 as shown.

While my improved dual armature latching relay has particular utility in connection with my light and manual controlled electrical system as shown in FIG. 2, it will be readily apparent that my relay will find utility in other applications. Further, while incandescent lamp 56 is shown as being the load energized by both the systems of FIGS. 1 and 2, it will be readily apparent that any other suitable load may be employed, such as the coil of an operating relay for a garage door actuator.

While I have illustrated and described specific embodiments of my invention, further modifications will become apparent to those skilled in the art, and I desire therefore in the appended claims to cover all modifications which do not depart from the spirit and scope of my invention.

What is claimed is:

1. A light and manually controlled electrical system comprising: light sensitive means; a relay having an operating coil; means coupling said light sensitive means and said coil for energizing the same responsive to a change in light from a first to a second level sensed by said light-sensitive means; an output circuit for connection to a load; said relay having contacts for coupling said output circuit to a source of energizing potential responsive to energization of said coil; a second relay having an operating coil coupled across said output circuit and energized responsive to closing of the contacts of said first relay, said second relay having contacts coupled to bypass said contacts of said first-named relay and directly to couple said output circuit to said source responsive to energization of the coil of said second relay whereby the coupling of said output circuit to said source and energization of the coil of said second relay are maintained despite deenergization of the coil of said first-named relay responsive to return of the light to said first level; time delay means coupled in circuit with the coil of said second relay for deenergizing the same a predetermined time following deenergization of the coil of said first-named relay; and manually actuated switch means coupling said source to said output circuit for selectively energizing the same.

2. The combination of claim 1 wherein said switch means is in parallel with the contacts of said first relay.

3. The combination of claim 1 wherein said time delay means comprises a thermally responsive switch having contacts in series with the coil of said second relay, a bimetallic element for actuating said last-named contacts and a heater for thermally affecting said bimetallic element, and wherein said first-named relay has other contacts coupled to energize said heater from said source thereby to cause opening of the thermal switch contacts after a predetermined time responsive to deenergization of the coil of said first relay.

4. A light and manually controlled electrical system comprising: light sensitive means; a relay having an operating coil; means coupling said light sensitive means and said coil for energizing the same responsive to a change in light from a first to a second level sensed by said light sensitive means; an output circuit for connection to a load; said relay including contacts having a first position responsive to energization of said coil and a second position responsive to deenergization thereof, said contacts in the first position connecting said output circuit to a source of energizing potential; a second relay having an operating coil; a thermally responsive switch including normally closed contacts carried by a bimetallic element and a heater therefor all connected in series with the coil of said second relay across said output circuit whereby the coil of said second relay is energized responsive to energization of the coil of the first-named relay, the current flow through the coil of said second relay being insufficient to actuate said thermal switch, said second relay having contacts directly connecting said ouput circuit to said source responsive to energization of its coil thereby maintaining the connection of said output circuit to said source and sealing-in the coil of said second relay despite deenergization of the coil of said first-named relay responsive to return of the light to said first level; a manually actuated switch including contacts having an "off" and an "on" position, said contacts of said first-named relay in their second position and said manual switch contacts in their "off" position completing a circuit in shunt with the coil of said second relay whereby said thermal switch is actuated after a predetermined time delay following deenergization of the coil of said first-named relay; the contacts of said manual switch in their "on" position and the contacts of said first-named switch in their second position directly connecting said output circuit to said source.

5. The combination of claim 4 further comprising a selectively adjustable resistor connected in series with the "off" contacts of said manual switch for selectively adjusting the current flow in said shunt circuit whereby the time delay of said thermal switch is adjusted.

6. A light and manually controlled electrical system comprising: light sensitive means; a relay having an operating coil; means coupling said light sensitive means and said coil for energizing the same responsive to a change in light from a first to a second level sensed by said light sensitive means; an output circuit for connection to a load; said relay having a magnetic frame with first and second armatures carried thereby and acted upon by said coil, first contacts carried by said first armature and being closed to couple said output circuit to a source of energizing potential responsive to energization of said coil; a bimetallic element having a portion latching said first armature in a position to close said first contacts whereby the coupling of said output circuit to said source is maintained despite deenergization of said coil, a heater for thermally affecting said bimetallic element thereby to unlatch said first armature after a predetermined time delay to permit opening of said first contacts; second contacts carried by said second armature and being closed to couple said heater across said output circuit responsive to deenergization of said coil; and manually actuated switch means for selectively energizing said output circuit from said source.

7. The combination of claim 6 wherein said light sensitive means comprises two photoconductive devices having high dark resistance and low light resistance serially connected with a potentiometer across said source, said potentiometer having a selectively adjustable tap and being connected between said devices, wherein said coupling means comprises a discharge tube having anode, cathode and control electrodes, said anode and cathode electrodes and said coil being connected in series across said source whereby the coil is energized responsive to firing of said tube, said control electrode being connected to said potentiometer tap with one of said devices being thereby coupled in parallel across said control and cathode electrodes and the other of said devices being coupled in parallel across said anode electrode and said coil whereby said tube fires responsive to a dark ambient light condition with transient light falling on said other device; and wherein said manual switch is connected across said other device for selectively short-circuiting the same thereby to cause said tube to fire.

8. The combination of claim 6 wherein said magnetic frame supports said coil and has a pivot portion, wherein said armatures are pivotally mounted on said pivot portion for movement respectively between first positions with said coil energized and second positions when said coil is deenergized; wherein said first and second contacts include movable contacts respectively carried by said first and second armatures and stationary contacts carried by said frame, and spring means normally biasing both of said armatures to their second positions.

9. The combination of claim 6 wherein one of said armatures is generally U-shaped and the other armature is elongated and secured to a member formed of flat spring stock, said other armature and member being disposed between the legs of the one armature and said member having one end secured to the bar portion of said one armature.

10. The combination of claim 6 wherein said magnetic frame supports one end of said coil and has a pivot portion extending upwardly along one side of said coil, said second armature being flat and generally U-shaped and pivotally mounted on said pivot portion remote from the ends of its legs with its legs extending over the other end of said coil, said first armature being elongated and secured to a member formed of flat spring stock, said first armature and member being disposed between the legs of said second armature and said member being secured adjacent one end thereof to the bar portion of said second armature, said member having its other end extending beyond the ends of the legs of said second armature, said armatures respectively having first positions when said coil is energized and second positions when said coil is deenergized, a spring interconnecting said pivot portion and said second armature and normally biasing both armatures to the second positions thereof, said frame having another portion extending upwardly on the other side of said coil, a bridging member connecting the legs of said second armature adjacent their ends and being disposed on the side of said first armature remote from said coil, said second contacts including at least one movable contact carried on said bridging member and at least one stationary contact carried by said other frame portion and cooperating with said one movable contact, said member having an opening formed therein adjacent its other end, said bimetallic element having one end secured to said other frame portion and extending upwardly generally parallel therewith, said latching portion being attached to the other end of said bimetallic element and extending through said opening in said member and normally engaging the same when said first armature is in its first position, said bimetallic element when deflected causing said latching portion to disengage said member to thereby permit said first armature to move to its second position when said coil is deenergized, said heater being elongated with one end secured to said one end of said bimetallic element on the side thereof remote from said other frame portion and extending upwardly normally in engagement with said bimetallic element, said first contacts including a movable contact carried by said member adjacent its other end and a stationary contact carried by a member secured to said one end of said heater and cooperating with said last-named movable contact.

References Cited in the file of this patent
UNITED STATES PATENTS

| | | |
|---|---|---|
| 2,165,048 | Gulliksen | July 4, 1939 |
| 2,278,920 | Evans et al. | Apr. 7, 1942 |
| 2,436,762 | Turin et al. | Feb. 24, 1948 |
| 2,549,865 | Trent | Apr. 24, 1951 |
| 2,738,448 | Bokser | Mar. 13, 1956 |
| 2,772,332 | Carlson | Nov. 27, 1956 |
| 2,869,044 | Horwege et al. | Jan. 13, 1959 |
| 2,913,549 | Howell | Nov. 17, 1959 |
| 2,914,709 | Rabinow | Nov. 24, 1959 |